Patented June 28, 1927.

1,633,840

UNITED STATES PATENT OFFICE.

WILLIAM R. LONG, OF ST. LOUIS, MISSOURI.

GLUE.

No Drawing.  Application filed September 24, 1924. Serial No. 739,707.

The object of my invention is to produce a gluing agent that is practically odorless, and a method of manufacturing it which will be inexpensive, and which gluing agent can be liquefied by chemical transformation by the simple method of mixing it with water—preferably warm—and which will remain in a thin liquid state ready for use for a reasonable time and will not jell.

This product is produced principally for gluing paper such as is used in the preparation of fibre and corrugated shipping cases, and also for sealing the cases or cartons after they have been packed with merchandise. The product may also be used for gluing other substances. My method of manufacturing consists, first, in converting corn starch into suitable paste to be hereinafter described, by means of an acid and the application of heat. My method of converting the corn starch into paste is as follows. To one hundred pounds of corn starch I add 5½ pints of a muriatic acid solution composed of 13½% commercial muriatic acid and 86½% of water. This product is placed on a floor or in a bin or other suitable container where it is permitted to remain for a period varying from twenty-four to forty-eight hours. This is done to permit the acid solution to thoroughly permeate the starch which puts the starch in a more suitable condition for conversion. The product is then placed in a converter of suitable size in such quantities as desired. This converter preferably comprises an air tight receptacle and a means of applying heat either directly, or indirectly through a jacket. A mixing apparatus is operatively secured in the converter and the latter is supplied with a steam gage for the purpose of ascertaining the pressure in the converter. The steam gage is necessary because when heat is applied beneath or around the converter pressure develops from the moisture contained in the starch. The mixture is agitated by means of the mixing apparatus. If a steam pressure of fifty pounds is reached in the converter, a small quantity of the acid solution should be used in the starch, but where a lower steam pressure is desired, that is from two to five pounds, the mixture may be used as indicated. Before the converter is opened the outside heat should be diminished or cut off, the pressure in the converter should be reduced to atmosphere by permitting the escape of the steam from the starch mixture through a small steam valve attached to the converter, and the application of heat entirely discontinued. A slightly inferior grade of glue may be produced without having a pressure above atmosphere in the converter simply by permitting the aqueous vapor given off from the starch in the converter to escape slowly so that the product is converted in a bath of steam and at the same time not under pressure. This is accomplished by allowing the valve to be opened sufficiently for the escape of sufficient steam to prevent a pressure above atmosphere. The time required to convert corn starch as above explained varies according to the heat applied and the amount of acid used, and will range from forty-five minutes to one and one-half hours.

In order to test the product to see of it is finished, about one or two ounces are taken out of the converter and about 12% of borax added in order to emulsify it. A solution is then made of one part of this mixture with five parts of water and quickly boiled over a gas flame; if the product is finished, a thin syrup substance will result. This method of testing has proven more reliable than chemical or gravity tests.

To this converted corn starch a sufficient amount of dry soda ash is added to neutralize the acid and the product removed from the converter and spread on a granitoid floor to a thickness of from three to four inches and permitted to cool. The resulting product is what I call paste. When this paste is thoroughly cooled it is placed in a mixing machine and 8% of finely ground caustic soda by weight is added and 4% of granulated or powdered borax. This is mixed for a few minutes until the chemicals are thoroughly incorporated in the paste. When this point is reached, it will be found that the mixture is reheated caused by chemical action to a certain extent. The mixture is then placed on the floor again and permitted to cool. It is then barreled and ready for use.

If the powdered compound is barreled while it is warm it will discolor and small yellow lumps will form, making it undesirable for use because such lumps are not readily soluble. When this compound is mixed at the rate of two pounds to three quarts of water preferably warm or hot, it produces a thin glue-like solution which flows freely and is easily applied, and can be spread thinly with a hand brush on the flaps of fibre shipping cases, and which will seal such shipping cases in less than sixty seconds. This is believed to be the most economical glue yet produced for the work for which it is recommended. The conventional gluing agent used for fibre board at the present time is sodium silicate. This weights approximately twelve pounds to the gallon, while my product weighs less than nine pounds and will cover 30% more surface to the gallon than sodium silicate.

What I claim and means to secure by Letters Patent is:

The process of making glue, which consists in mixing together in the cold, a specially converted starch, 8% finely ground caustic soda, and 4% granlated borax, the converted starch being a product formed by heating and agitating a mixture of corn starch and a small amount of a dilute solution of muriatic acid at temperatures above 212° F. and thereafter neutralizing it with soda ash.

In testimony whereof I affix my signature.

WILLIAM R. LONG.